US006827888B2

(12) United States Patent
Harfmann

(10) Patent No.: US 6,827,888 B2
(45) Date of Patent: Dec. 7, 2004

(54) POLYMERIC FOAM SHEET USING AMBIENT GAS BLOWING AGENT VIA CONTROLLED EXPANSION

(75) Inventor: Walter R. Harfmann, Matthews, NC (US)

(73) Assignee: Genpak LLC, Glens Falls, NY (US)

( * ) Notice: Subject to any disclaimer, the term of this patent is extended or adjusted under 35 U.S.C. 154(b) by 214 days.

(21) Appl. No.: 09/768,762

(22) Filed: Jan. 23, 2001

(65) Prior Publication Data

US 2002/0135088 A1 Sep. 26, 2002

(51) Int. Cl.[7] ............................................. B29C 44/20
(52) U.S. Cl. ........................ 264/39; 264/50; 264/51; 264/338
(58) Field of Search ...................... 264/50, 51, 338, 264/39

(56) References Cited

U.S. PATENT DOCUMENTS

| | | | |
|---|---|---|---|
| 3,591,895 A | 7/1971 | Britt | 18/14 S |
| 3,895,086 A | 7/1975 | Berner | 264/45.4 |
| 4,009,976 A | 3/1977 | Johnson | 425/68 |
| 4,323,528 A | * 4/1982 | Collins | 264/53 |
| 4,548,775 A | 10/1985 | Hayashi et al. | 264/45.5 |
| 4,574,459 A | * 3/1986 | Peters | 29/527.4 |
| 4,657,715 A | * 4/1987 | Myers et al. | 264/45.5 |
| 4,732,718 A | 3/1988 | Jentet | 264/45.5 |
| 5,348,795 A | 9/1994 | Park | 428/220 |
| 5,393,536 A | 2/1995 | Brandt et al. | 425/112 |
| 5,543,217 A | * 8/1996 | Morgan | 428/375 |
| 5,567,742 A | * 10/1996 | Park | 521/143 |
| 5,817,705 A | * 10/1998 | Wilkes et al. | 521/79 |
| 5,905,098 A | 5/1999 | Wilkes et al. | 521/88 |
| 6,127,440 A | * 10/2000 | Sanyasi | 521/74 |
| 6,174,930 B1 | * 1/2001 | Agarwal et al. | 521/134 |
| 6,383,425 B1 | * 5/2002 | Wu et al. | 264/51 |

FOREIGN PATENT DOCUMENTS

| | | | |
|---|---|---|---|
| CA | 451864 | 10/1948 | |
| DE | 26 16 686 S1 | 10/1977 | ........... B29D/27/00 |
| DE | 199 46 523 A1 | 4/2001 | ........... B29C/44/50 |
| EP | 10128826 | 5/1998 | ........... B29C/47/20 |
| EP | 2000246782 | 12/2000 | ........... B29C/47/20 |
| FR | 2 633 554 | 1/1990 | ........... B29C/47/20 |
| GB | 1075474 | 7/1967 | ........... B29C/67/22 |
| JP | J5 9212-234 A | 12/1984 | |
| JP | J6 2011-623 A | 1/1987 | |
| JP | 11235746 | 8/1999 | ........... B29C/47/86 |
| WO | WO 01/34687 A1 | 5/2001 | ............. G08J/9/12 |

* cited by examiner

*Primary Examiner*—Allan R. Kuhns
(74) *Attorney, Agent, or Firm*—Wayne F. Reinke, Esq.; Heslin Rothenberg Farley & Mesiti P.C.

(57) ABSTRACT

An annular die designed to produce polymer foam using only one or more ambient gasses as a blowing agent includes an exiting channel with an exit having a cross-sectional area between about two and about ten times that of a smallest point within the exit channel. The section of the die from the smallest point to the exit is thermally isolated from the rest of the die, and the temperature thereof is independently controlled. In addition, the interior surface of the exit channel is coated with a friction-reducing coating.

28 Claims, 5 Drawing Sheets

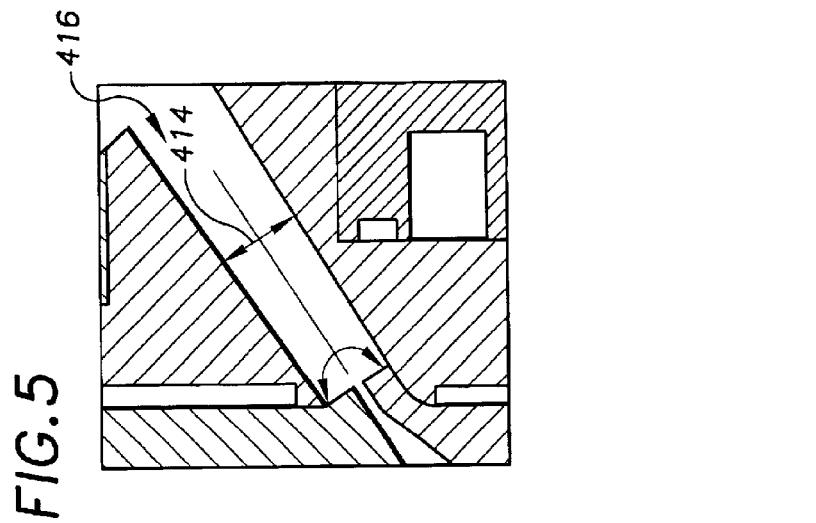
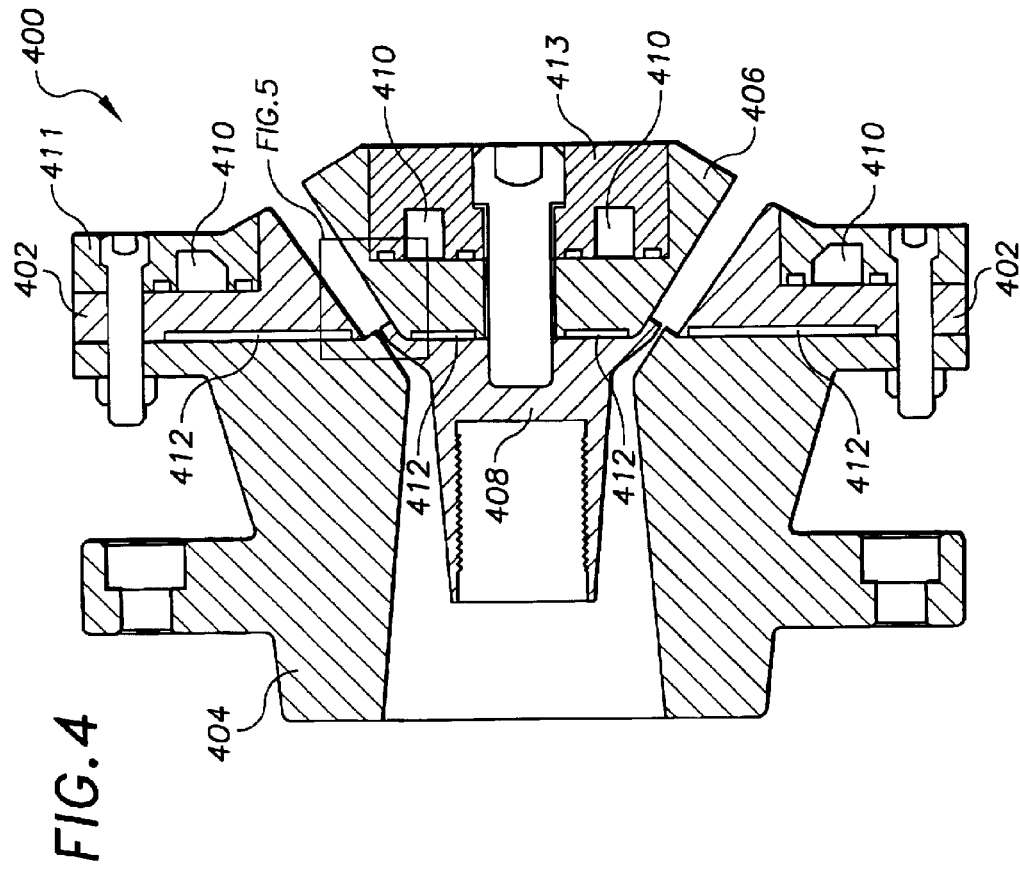

POLYMERIC FOAM SHEET USING AMBIENT GAS BLOWING AGENT VIA CONTROLLED EXPANSION

BACKGROUND OF THE INVENTION

1. Technical Field

The present invention generally relates to polymer foam sheet formation. More particularly, the present invention relates to polymer foam sheet formation using only ambient gas blowing agents.

2. Background Information

Polymer products produced by thermoforming of polymer sheet (e.g., polystyrene sheet) have proven useful in a great many applications. One of the major applications for this type of product is disposable food packaging. Historically, there has been some marketplace resistance to this product due to environmental concerns. One of the first major issues was concern of the destruction of the ozone layer due to the release of the Chloroflourocarbons used as blowing agents. Chloroflourocarbons were eliminated and mostly replaced with hydrocarbons or hydrocarbon/carbon dioxide blends. Concern over landfills then became the next major environmental issue addressed and has been somewhat alleviated through ongoing recycling programs. A current concern is, however, the use of hydrocarbon blowing agents. These gasses escape from the product over time, causing concern about ozone generation at ground level. Hydrocarbon blowing agents also present a practical problem to producers, as cumbersome environmental permits are required, as well as expensive pollution abatement equipment. Pollution abatement, however, addresses only those hydrocarbons released at the plant location and does not address the hydrocarbon gasses that are shipped out of the production plant as part of the product and released later. In addition, these gasses are highly flammable, resulting in expensive equipment and sensors designed for flammable environments, high insurance premiums, and most important, occasional worker injuries caused by fire.

In an effort to minimize the problems noted above with the use of hydrocarbon blowing agents, many companies have resorted to using hydrocarbon blends with ambient gasses, most significantly carbon dioxide. However, commercial technology generally limits the amount of carbon dioxide that can be used to less than 50 mole percent of the blowing agent present at manufacture. Carbon dioxide has a very high vapor pressure compared with the hydrocarbon blowing agents. It therefore causes rapid expansion of the foam mass on exit of the die which results in sheet corrugation, thin gauge, irregular cell size, and/or poor surface appearance. Corrugation is defined as numerous gauge bands in the machine direction of foam sheet causing local gauge variations of greater than 5%. Limiting the problems associated with the use of carbon dioxide limits the amount that can be successfully used in manufacture without compromising quality or increasing product weight. Any attempts to use only carbon dioxide as a blowing agent have resulted in product that is of either inferior quality or more than 10% greater in weight compared to product made using at least a portion of hydrocarbon blowing agents. These problems are magnified for other ambient gasses, as they have vapor pressures much higher than carbon dioxide.

An additional problem found with the use of ambient gasses is the lack of post expansion when thermoforming the sheet. The permeation rate of hydrocarbons through polystyrene is much slower than that of ambient gasses. As a result, upon aging of the sheet for a number of days, the partial pressure inside the foam sheet is significantly greater than one atmosphere. Thus, by the ideal gas law, the sheet can be expected to expand between 50% and 120% when heated to the glass transition temperature. Without this increase in partial pressure, only thermal expansion effects of 10% to 40% gauge increases are realized. This expansion is necessary to produce the low densities required of the final product. It is known that the strength-to-weight ratio improves for foam as the density is reduced. Therefore, without this expansion, the product would be weaker and require more weight to compensate, which again has a severe negative economic impact. One potential solution is to reduce the density of the sheet such that further density reduction requirements at forming are not needed. This solution requires more blowing agent, which exasperates all of the negatives associated with these ambient blowing agents already described.

There exists, therefore, a need to produce polymer foam sheet using only ambient gasses that has little or no corrugation, uniform cell structure, and low density. Such sheet could then be thermoformed into the final product desired without either reduction in quality or increase in product weight.

SUMMARY OF THE INVENTION

Briefly, the present invention satisfies the need to produce polymer foam using only one or more ambient gasses as blowing agents by providing an annular die designed to address the problems resulting from their exclusive use.

In accordance with the above, it is an object of the present invention to provide an annular die for producing polymer foam using only one or more ambient gasses as blowing agents.

The present invention provides, in a first aspect, a method of producing polymer foam. The method comprises heating a polymer resin to its melt temperature, selecting at least one blowing agent consisting of at least one ambient gas, combining the heated polymer resin with the blowing agent(s) to create a mixture, and extruding polymer foam sheet from the mixture comparable in quality to that obtainable with hydrocarbon blowing agents.

The present invention provides, in a second aspect, an annular die for producing polymer foam. The annular die comprises an exiting channel having an exit with a cross-sectional area larger than at least one point within the exiting channel.

These, and other objects, features and advantages of this invention will become apparent from the following detailed description of the various aspects of the invention taken in conjunction with the accompanying drawings.

BRIEF DESCRIPTION OF THE DRAWINGS

FIG. 4 is a cross-sectional view of an annular die in accordance with the present invention wherein constraining geometry is coupled to the die and the transition angle is about 90°.

FIG. 5 is an exploded view of one section of the annular die of FIG. 4.

DETAILED DESCRIPTION OF THE INVENTION

The present invention constrains the growth rate of polymeric foams such that foam sheet can be produced at low density with no corrugation, uniform cell size, and good surface appearance. An annular constraining geometry is added to typical annular dies by either incorporating the constraining geometry as part of the die lips or adding an external constraining geometry section to the die. The constraining geometry allows the polymer mass containing blowing agent to partially expand before leaving the die structure. A central problem in producing foam using such a die is that pre-foaming occurs, which typically results in poor surface quality and irregular cell size. Previous limitations of such a die are overcome by thermally isolating the constraining section of the die from the rest of the die structure, and independently controlling the temperature in that section. Additionally, an interior surface coating further reduces friction. In this way, the frictional characteristics of the die and the rate of expansion are controlled such that a foam sheet with smooth surface and uniform cell structure is obtained. Additionally, since the foam structure is substantially reduced in density before exiting the constraining geometry, the further rate of foam expansion is reduced and corrugation is avoided. Low density foam sheet can therefore be produced suitable for thermoforming into final products that have quality and part weights comparable in quality to current products on the market using only ambient gasses as blowing agents (i.e., carbon dioxide, nitrogen, and argon).

Figure 1:
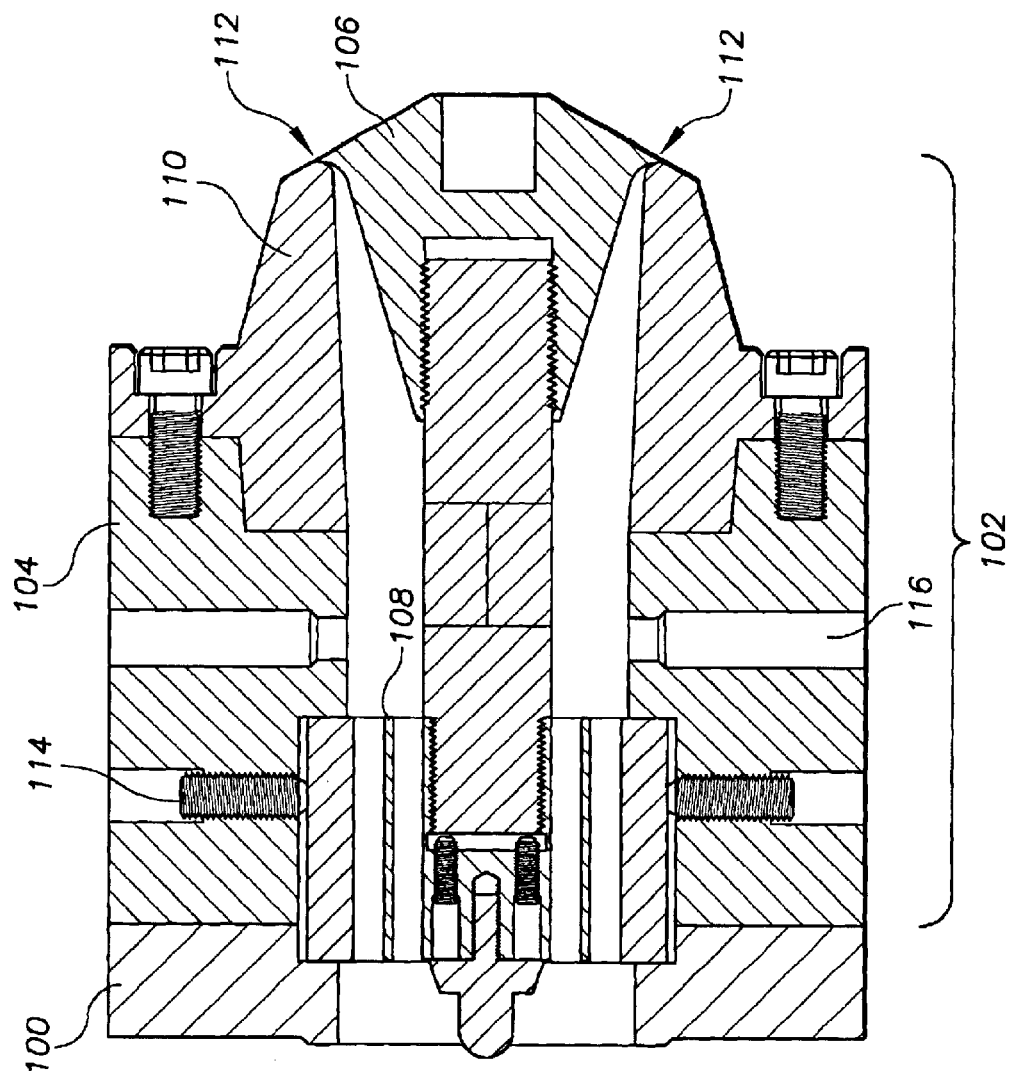
FIG. 1 is a cross-sectional view of a representative prior art annular die assembly.

Before describing the present invention, it will be useful to understand the typical construction of a conventional annular die. FIG. 1 is a cross-sectional view of such a die. A die adaptor 100 is used to connect the die 102 to a typical foam extruder. Polymer passes through this adaptor into the body 104 of the die. The die body contains means for mounting an interior male die lip 106. The mounting means may comprise either a spider or breaker plate assembly. In FIG. 1, a breaker assembly 108 is represented. The function of this assembly is to provide a means of mounting the interior die lip while allowing the polymer to simultaneously pass through. The interior die lip and an exterior die lip 110 are attached to the die and define an opening 112 for the polymer to exit. The opening may be adjusted by moving either die lip appropriately. Additionally, means of centration are provided, in this case four centering bolts 114 (since FIG. 1 is a cross-sectional view, only two bolts are shown) allow the male die lip to be moved such that extrudate is uniform around the entire circumference of the die. Various instruments such as thermocouples and pressure transducers may be used to monitor the performance of the process and are mounted in the provided ports 116.

Typical of annular dies, the minimum cross-sectional opening of the exit channel is at the actual exit of the die (here, opening 112, also referred to as the die gap). When producing a foam product, die pressures are maintained such that the blowing agent remains in solution. Most desired is a halo appearance at the die exit indicating that foaming is occurring after exiting of the die. This typically results in a uniform cell structure and uniform surface appearance. Should the die pressure not be high enough to keep the blowing agent in solution, a condition known as pre-foaming will occur. The extrudate will begin foaming within the die body. The resultant foam will be characterized as having a very poor surface appearance and poor cell size distribution. Product made from such foam is inferior in quality and is generally rejected by the customer.

The die pressure needed to maintain the blowing agent in solution depends on the blowing agent selected. The vapor pressure and solubility of the gas in the polymer will determine the needed die pressure to prevent pre-foaming. In the case of polystyrene, for example, one blowing agent that has proven to work well in pentane. At a concentration of about 5%, pentane will typically yield a uniform foam with a density of about 0.1 g/cc (i.e., grams per cubic centimeter). The die pressure required to keep this gas in solution is less than 140 bar, which allows a die opening large enough to avoid corrugation. Corrugation occurs when the rate of foam growth exceeds the available geometry. Specifically, the circumference of the growing foam exceeds the circumference geometrically available and the additional length forms a sinusoidal pattern about the center of radial growth. The negative impact of this phenomenon is that the foam will be thicker and thinner in spots across the sheet width and the product made with such foam will have inferior physical properties. Since product thickness, width and basis weight are controlled variables, both the amount of gas needed to attain the desired density reduction (and thereby thickness) and the machine direction speed is fixed. In addition, since foam growth is three-dimensional, the die must be smaller in circumference than the final width of the sheet produced. These constraints therefore allow only limited freedom in geometric configuration. Ideally, the growth in all three dimensions is at a rate of the cube root of the expansion ratio, where the expansion ratio is defined as the final density of the foam divided by the density of the unexpanded melt. Such growth would result in nearly spherical cells and equal strength of the product in each dimension.

In practice, however, limitations result in growth that is generally unbalanced in the three dimensions. If the die gap is too small, for example, the thickness of the product cannot be achieved and extra growth will be forced into radial growth, which can cause corrugation. Also, if the ratio of the width of the sheet (which is generally determined by the circumference of the cooling mandrel used after sheet formation) to the circumference of the die is too small, corrugation will also occur. It is therefore desired to keep this ratio high enough so that the melt cannot be further stretched without tearing. For polystyrene foams, this ratio is generally between 3 and 5.

The problem with using ambient gasses to produce polymer foam sheet is therefore complex. These gasses have very high vapor pressures and very low solubility in most polymers. A high die pressure is therefore required to prevent pre-foaming at the gas concentrations required to make low-density foam. For the purpose of this invention, low density foam is defined as foam with a density less than 0.15 g/cc. A high die pressure requires a small die gap, which then causes the sheet to corrugate severely and limits the thickness the sheet can attain. Polymer foam sheet produced in accordance with the present invention preferably has a thickness of between about 0.75 mm and 6 mm, and gauge variation across a width thereof of less than about 5%. Additionally, due to the high vapor pressure of these gasses, the foam reaches its final density very quickly after exiting the die. Again, corrugation will occur as the circumference of the growing sheet is at nearly the final sheet width while the geometric constraint is still near the circumference of the die. Again, as previously discussed, the additional length must be accommodated as a sinusoidal pattern about the center of the circle declining the radial growth. As a result, using ambient gasses exclusively has always resulted in either a product that was inferior due to pre-foaming or corrugation, or both, or a product of limited density reduction produced by limitingd the amount of ambient blowing agent to avoid the problems previously described.

The present invention solves these problems through a reduction in the growth rate of the foam after exiting the die by allowing some growth within the die. By carefully controlling both the amount of growth and the rate of growth, a uniform cell structure can be achieved. In addition, by controlling the frictional characteristics of the polymer-die interface, either through application of coatings and/or via temperature control of the die, a uniform smooth surface can be maintained on the foam product. By using a die designed for this purpose, foam sheet can be made using only ambient gasses that is comparable in density and quality to sheet made using conventional hydrocarbon-based blowing agents. Typical density for such a conventional product would be about 0.05 to about 0.15 g/cc, typical cell size would range from about 0.05 to about 1.0 mm, and a typical thickness would range from about 0.75 to about 6 mm. Additionally, the surface would be uniform in appearance and there would be no corrugation gauge bands in the product. Therefore, polymer foam sheet produced in accordance with the present invention preferably has a thickness of between about 0.75 mm and about 6 mm gauge variation across a width thereof of less than about 5%, and a uniform appearance.

Figure 2:
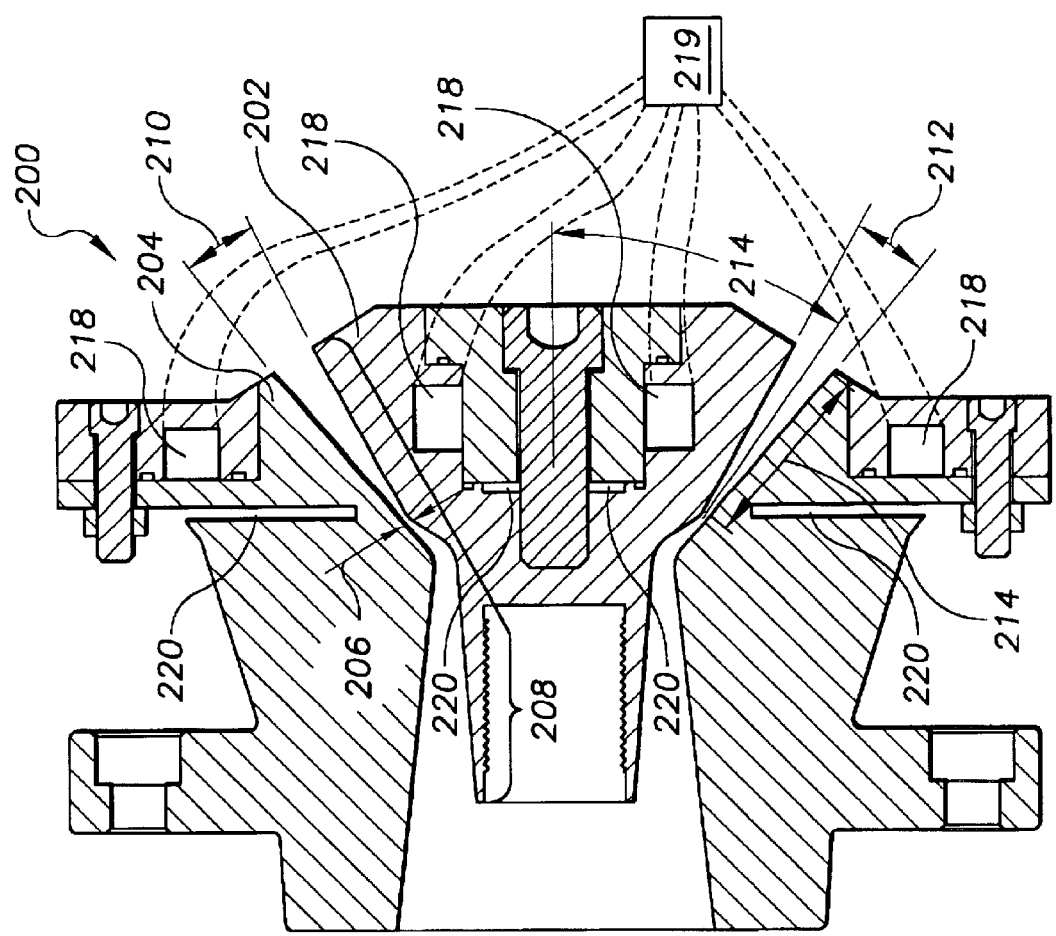
FIG. 2 is a cross-sectional view of an annular die in accordance with the present invention wherein constraining geometry is an integral part of the die lips.

FIG. 2 is a cross-sectional view of one example of an annular die 200 in accordance with the present invention, in which the constraining geometry is an integral part of the die lips. Not shown are the adaptor, die body, male lip mounting, concentration means, and instrumentation ports which remain unaltered from FIG. 1. In FIG. 2, the male die lip 202 and female die lip 204 depicted have been greatly altered, compared to FIG. 1. The die lips establish a minimum die opening 206 within an exiting channel 208 in the body of the die, generally in the range of about 0.25 mm to about 1.0 mm, depending on the die pressure needed to keep the blowing agent in solution. The lips then diverge to form an exit opening 210 that is between about 2 to about 10 times greater in cross-sectional area than the cross-sectional opening defined by the minimum opening. For purposes of this description, the exit point of the die is defined as the point at which the foam sheet leaves the die surface. This can occur within the exiting channel if the sheet to be made is thinner than the final exit point. The angle 212 at which the die lips diverge will depend on the polymer/blowing agent mixture to be foamed, as will the exit length 214. For polystyrene foamed with carbon dioxide, for example, a divergence angle of about 3° and an exit length of about 25.4 mm has been found useful. It should be noted that the divergence over the exit length can be linear or some other geometry. Usefulness of this concept is not limited to linear geometry. An additional design parameter is the die exit angle 216, which is shown to be about 34° in FIG. 2, but may range from 0 to about 90°.

By using the above geometry, the foam growth rate can be controlled so as to form uniform cells in a sheet without corrugation. Without other die modifications, however, the surface quality of the foam would still be poor. To attain a uniform surface of good appearance, the frictional properties of the foam/die lip interface are also modified. This may be accomplished by, for example, applying coatings on the inner surface of a portion or all of the exiting channel, such as, for example, a composite of nickel and either tetrafluoroethylene fluorocarbon polymer or fluorinated ethylene-propylene (e.g., TEFLON by du Pont), titanium nitride, tungsten carbon carbide, or other similar coatings with good slip characteristics. Another example of modifying frictional properties as shown in FIG. 2, is by temperature control of the expanding portion of the exit channel beyond minimum opening 206. In FIG. 2, temperature control is accomplished by circulating tempered oil, for example, through cooling channels 218 provided. An external cooling/circulation unit 219 can be used to temper the die exit geometry to the proper temperature and circulate the oil via coupled conduits (shown in phantom). For polystyrene foams, for example, a temperature of about 30 C to about 40 C has been found to be particularly useful. It is also preferable to have independent control of the male and female die lip temperatures, and for this reason, it is useful to have separate cooling and circulation units for each.

The temperature needed to produce a uniform skin of good quality is, however, generally low enough to freeze the extrudate within the exiting channel over a short period of time. Thermal breaks 220 solve this problem by minimizing heat transfer in the die at the point of the minimum opening 206, and thereby preventing the extrudate from freezing in the die.

Figure 3:
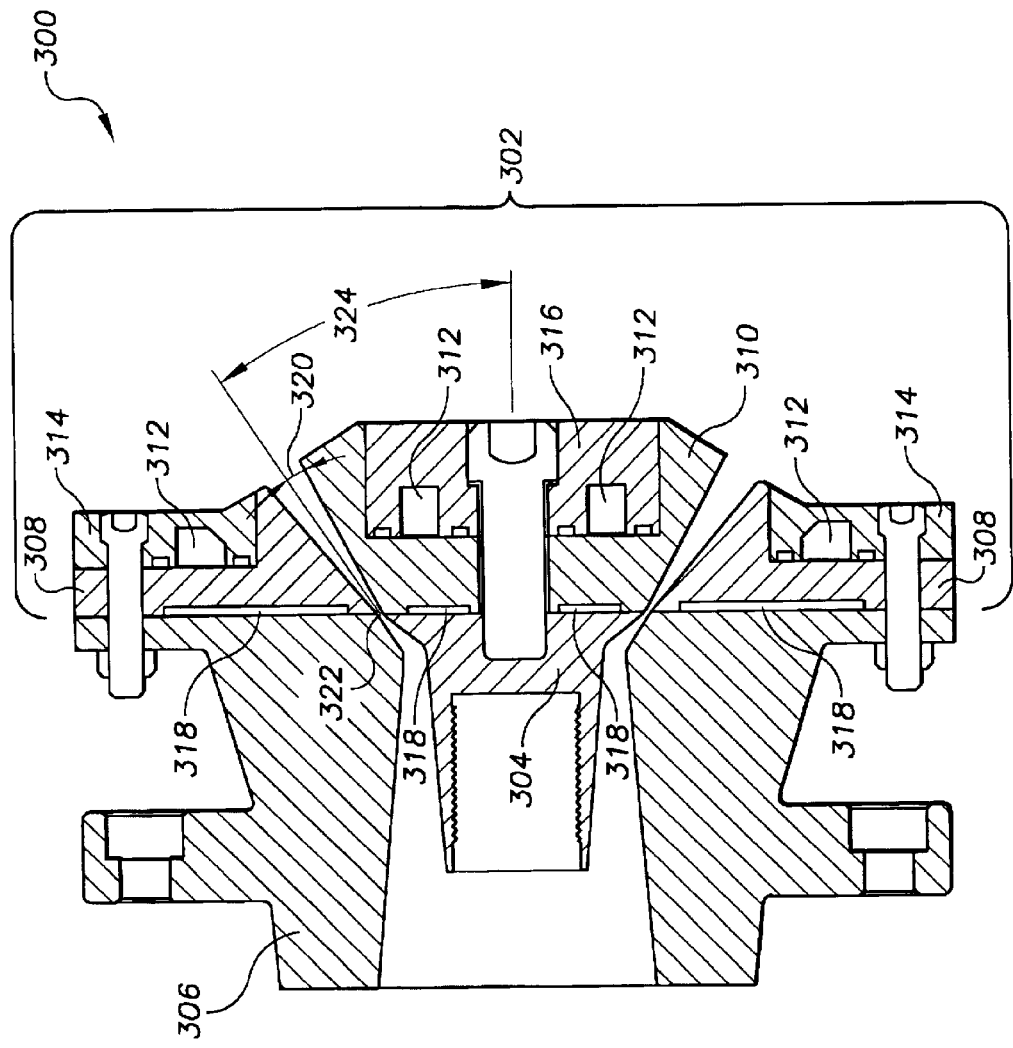
FIG. 3 is a cross-sectional view of an annular die in accordance with the present invention wherein constraining geometry is coupled to the die and the transition angle is about 10°.

FIG. 3 is a cross-sectional view of another example of an annular die 300 in accordance with the present invention. In FIG. 3, the expansion geometry 302 is attached to existing male die lip 304 and existing female die lip 306. Unlike die 200, where the exit geometry was an integral part of the lips, in FIG. 3, the exit geometry is coupled to the die at the lips. Exit female die lip portion 308 is coupled to existing female lip 306 and exit male die lip portion 310 is coupled to existing male die lip 304. As with FIG. 2, cooling channels 312 for tempering of the exit lips are provided. Inserts 314 and 316 are one example of how to achieve the cooling channels. Similarly, thermal breaks 318 between the new die lip portions and the existing die lips are also provided. As shown in FIG. 3, the divergence angle 320 is about 10° with a uniform transition from the point 322 of smallest cross-sectional area in the exit channel. The exit angle 324 of this example is shown to be about 45°.

FIG. 4 is a cross-sectional view of the die lip portion 400 of another example of an annular die in accordance with the present invention. In FIG. 4 as in FIG. 3, the female exit lip 402 is coupled to the existing female die lip 404, and the male exit lip 406 is coupled to the existing male die lip 408. Again, cooling channels 410 and a thermal break 412 are provided, along with inserts 411 and 413. In the example of FIG. 4, the divergence angle 414 is about 0° to an opening 416 (see FIG. 5), however a transition angle 418 exists wherein the die opening transitions to the divergence channel. The transition angle in the FIG. 4 example is 180°, but may vary from about 15° to about 180°.

EXAMPLE 1

Experimental sheet foam was manufactured using a two-inch primary by 2.5 inch tandem extrusion line, under the following conditions:

| Temperature: | |
| --- | --- |
| Primary Extruder Zone 1 | 177° C. |
| Primary Extruder Zone 2 | 199° C. |
| Primary Extruder Zone 3 | 215° C. |
| Primary Extruder Zone 4 | 221° C. |
| Primary Extruder Zone 5 | 223° C. |
| Crossover Zone 6 | 234° C. |
| Crossover Zone 7 | 218° C. |
| Seal Zone 8 | 101° C. |
| Secondary Extruder Zone 9 | 121° C. |
| Secondary Extruder Zone 10 | 107° C. |
| Secondary Extruder Zone 11 | 102° C. |
| Secondary Extruder Zone 12 | 110° C. |
| Die Zone 13 | 142° C. |
| Die Zone 14 | 132° C. |
| Coupling Melt | 222° C. |
| Die Melt | 133° C. |
| Pressures: | |
| Blowing Agent Compressor | 310.3 Bar |
| Injection Port | 227.6 Bar |
| 2 Inch Extruder | 234.5 Bar |
| Crossover | 194.5 Bar |
| Die | 59.3 Bar |
| Drive Conditions: | |
| Primary Speed | 75 rpm |
| Primary Current | 30 amps |
| Secondary Speed | 24.8 rpm |
| Secondary Current | 18 amps |
| Formulation: | |
| Polymer Type | Polystyrene (Dow STYRON 685D) |
| Polymer Rate | 25.5 kg/hr |
| Nucleator Type | Talc Concentrate (50%) |
| Nucleator Rate | 0.36 kg/hr |
| Blowing Agent Type | Carbon Dioxide |
| Blowing Agent Rate | 0.77 kg/hr |
| Miscellaneous: | |
| Date of manufacture | March 19, 1996 |
| Time of Sample | 12:00 pm |

-continued

| Test Data: | |
| --- | --- |
| Average Thickness | 9.15 mm |
| Maximum Deviation | 0.19 mm |
| Percentage Deviation | 2.1% |
| Sample Density | 0.088 g/cc |
| Sample Cell Size | 0.87 mm |

Figure 6:
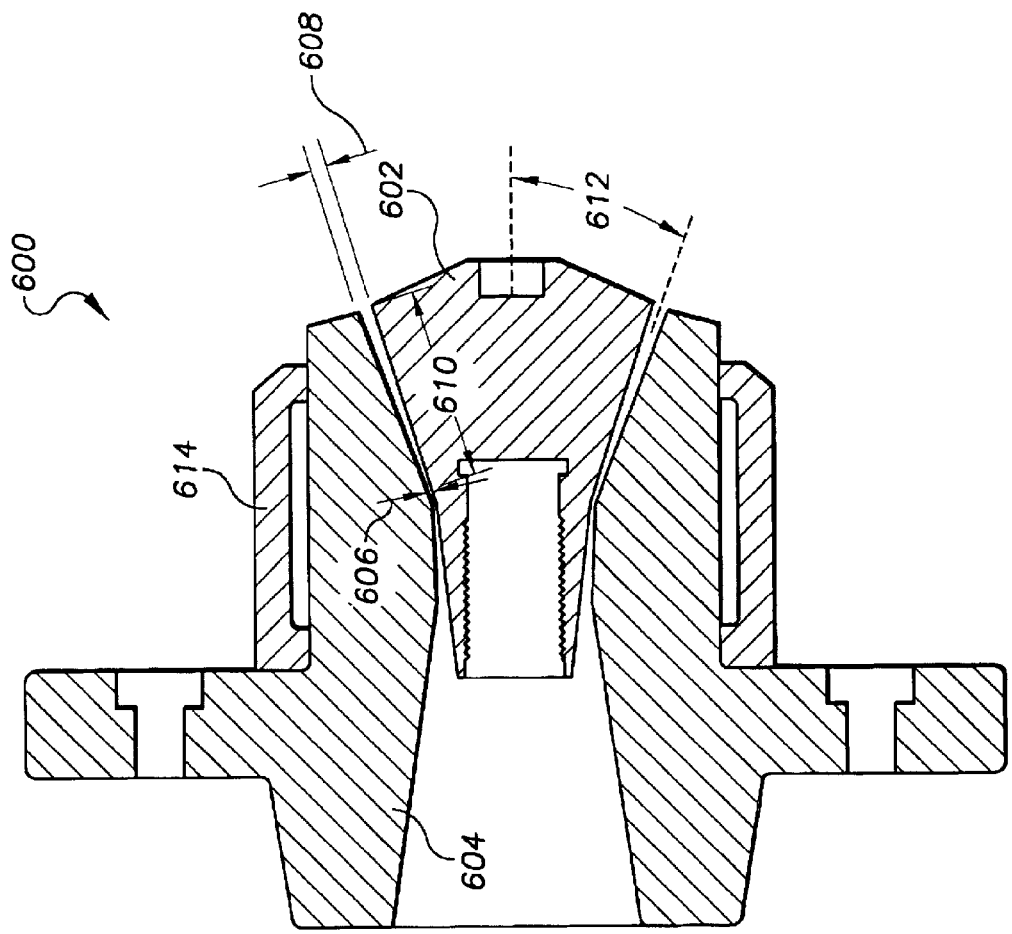
FIG. 6 is a cross-sectional view of a prototype annular die used to produce the results of Example 1.

The sample of Example 1 was produced with the annular die 600 of FIG. 6. A male die lip 602 and female die lip 604 create an opening 606. The divergence angle 608 of this die was about 3°, the exiting channel 610 had a length of about 25.4 mm and the exit angle 612 of the die was about 34". Annular die 600 had exterior (female die) lip air cooling means 614 only, which kept the die at about 60° C. No means of cooling the male die lip was provided on this prototype die. In general, the section of the existing channel from the smallest cross-sectional point to the exit is preferably kept at a temperature of between about 15° C. and about 95° C., and more preferably at a temperature of between about 25° C. and about 60° C., this temperature being determined subjectively by the best surface appearance. In addition, the foam produced preferably has a density of between about 0.05 g/cc and about 0.15 g/cc, and an average cell diameter of about 0.05 mm to about 1 mm.

As can be seen from the data above, the sample produced has a density typical of foam sheet. The cell size and thickness were both extraordinarily large for foam made using only carbon dioxide, indicating that the constraining section of the die did indeed inhibit the rate of cell growth. The sample showed no visual signs of corrugation as evidenced by a sample thickness deviation of less than 3%. The exterior skin of this product was smooth and uniform while the interior skin was rough and showed signs of melt fracture. This indicates that tempering of the constraining surface produces a uniform, saleable skin surface. Die pressures rose slowly during the trial as the cool lips excessively cooled the die itself, indicating the need for a thermal break between the cooled constraining section of the die and the rest of the die and die body.

While several aspects of the present invention have been described and depicted herein, alternative aspects may be effected by those skilled in the art to accomplish the same objectives. Accordingly, it is intended by the appended claims to cover all such alternative aspects as fall within the true spirit and scope of the invention.

What is claimed is:

1. A method of producing polystyrene foam, comprising:
heating a polystyrene resin to a melt temperature therefor;
selecting at least one blowing agent consisting of at least one ambient gas;
combining the heated polystyrene resin with the at least one blowing agent to create a mixture;
extruding polystyrene foam sheet from the mixture, the polystyrene foam having a density of between about 0.05 g/cc and about 0.15 g/cc and an average cell diameter of about 0.05 mm to about 1 mm, the polystyrene foam sheet having a thickness of between about 0.75 mm and about 6 mm;
wherein the extruding comprises guiding the mixture through an annular exiting channel to an exit with a cross-sectional area larger than at least one point within the exiting channel, and reducing friction within at least a portion of the exiting channel; and wherein the exiting channel comprises a first portion from an entrance to a point having a smallest cross-sectional area and a second portion from the point having the smallest cross-sectional area to the exit, and wherein the reducing comprises controlling a temperature of second portion.

2. The method of claim 1, wherein the cross-sectional area of the exit is at least about twice as large as that of the at least one point.

3. The method of claim 1, wherein the controlling comprises keeping the second portion at a temperature of between about 15° Celsius and about 95° Celsius.

4. The method of claim 3, wherein the keeping comprises keeping the second portion at a temperature of between about 25° Celsius and about 60° Celsius.

5. The method of claim 1, further comprising controlling pre-foaming in the second portion.

6. The method of claim 1, wherein the reducing comprises coating the at least a portion of the exiting channel with a friction-reducing substance.

7. The method of claim 6, wherein the coating comprises coating the at least a portion of the exiting channel with titanium nitride.

8. The method of claim 1, wherein selecting the at least one blowing agent comprises selecting from among carbon dioxide, nitrogen and argon.

9. The method of claim 1, wherein the extruding comprises extruding polymer foam sheet from the mixture having less than about 5% gauge variation across a width thereof.

10. A method of producing polymer foam, comprising:

heating a polymer resin to a melt temperature therefor;

selecting at least one blowing agent consisting of at least one ambient gas;

combining the heated polymer resin with the at least one blowing agent to create a mixture;

extruding polymer foam from the mixture comparable in quality to that obtainable with hydrocarbon blowing agents, the polymer foam having a density of less than about 0.15 g/cc, wherein the extruding comprises guiding the mixture through an exiting channel to an exit with a cross-sectional area larger than at least one point within the exiting channel and reducing friction within at least a portion of the exiting channel;

wherein the exiting channel comprises a first portion from an entrance to a point having a smallest cross-sectional area and a second portion from the point having the smallest cross-sectional area to the exit, and wherein the reducing comprises controlling a temperature of the second portion; and controlling pre-foaming in the second portion, wherein controlling pre-foaming in the second portion comprises location at least one air gap between the first portion and the second portion.

11. A method of producing polymer foam, comprising:

heating a polymer resin to a melt temperature therefor;

selecting at least one blowing agent consisting of at least one ambient gas;

combining the heated polymer resin with the at least one blowing agent to create a mixture;

extruding polymer foam from the mixture comparable in quality to that obtainable with hydrocarbon blowing agents, the polymer foam having a density of less than about 0.15 g/cc, wherein the extruding comprises guiding the mixture through an exiting channel to an exit with a cross-sectional area larger then at least one point within the exiting channel and reducing friction within at least a portion of the exiting channel;

wherein the reducing comprises coating the at least a portion of the exiting channel with a friction-reducing substance; and wherein the coating comprises coating the at least a portion of the exiting channel with tungsten carbon carbide.

12. A method of producing polymer foam, comprising:

heating a polymer resin to a melt temperature therefor;

selecting at least one blowing agent consisting of at least one ambient gas;

combining the heated polymer resin with the at least one blowing agent to create a mixture;

extruding polymer foam the mixture comparable in quality to that obtainable with hydrocarbon blowing agents, the polymer foam having a density of less than about 0.15 g/cc, wherein the extruding comprises guiding the mixture through an exiting channel to an exit with a cross-sectional area larger than at least one point within the exiting channel and reducing friction within at least a portion of the exiting channel;

wherein the reducing comprises coating the at least a portion of the exiting channel with a friction-reducing substance; and wherein the coating comprises coating the at least a portion of the exiting channel with a composite comprising nickel and one of tetrafluoroethylene fluorocarbon polymer and fluorinated ethylene-propylene.

13. A method of producing polystyrene foam, comprising;

heating a polystyrene resin to a melt temperature therefor;

selecting at least one blowing agent consisting of at least one ambient gas;

combining the heated polystyrene resin with the at least one blowing agent to create a mixture;

extruding polystyrene foam having a density of less than about 0.15 g/cc from the mixture quality agents, comprising guiding the mixture through an exiting channel comprising a first portion from an entrance to a point having a smallest cross-sectional area and a second portion from the point to an exit; and controlling pre-foaming in the second portion.

14. The method of claim 13, wherein the exit has a cross-sectional area larger than the point.

15. The method of claim 14, wherein the cross-sectional area of the exit is at least about twice as large as that of the point.

16. The method of claim 14, wherein the extruding further comprises reducing friction within at least a portion of the exiting channel.

17. The method of claim 16, wherein the reducing comprises controlling a temperature of the second portion.

18. The method of claim 17, wherein the controlling comprises keeping the second portion at a temperature of between about 15° Celsius and about 95° Celsius.

19. The method of claim 18, wherein the keeping comprises keeping the second portion at a temperature of between about 25° Celsius and about 60° Celsius.

20. The method of claim 17, wherein the reducing comprises coating the at least a portion of the exiting channel with a friction-reducing substance.

21. The method of claim 20, wherein the coating comprises coating the at least a portion of the exiting channel with titanium nitride.

22. The method of claim 13, wherein selecting the at least one blowing agent comprises selecting from among carbon dioxide, nitrogen and argon.

23. The method of claim 13, wherein the extruding comprises extruding polymer foam from the mixture having a density of between about 0.05 g/cc and about 0.015 g/cc and an average cell diameter of about 0.05 mm to about 1 mm.

24. The method of claim 23, wherein the extruding comprises extruding polymer foam sheet from the mixture having a thickness of between about 0.75 mm and about 6 mm.

25. The method of claim 24, wherein the extruding comprises extruding polymer foam sheet from the mixture having less than about 5% gauge variation across a width thereof.

26. A method of producing polymer foam, comprising:

heating a polymer resin to a melt temperature therefor;

selecting at least one blowing agent consisting of at least one ambient gas;

combining the heated polymer resin with the at least one blowing agent to create a mixture;

extruding polymer foam the mixture comparable in quality to that obtainable with hydrocarbon blowing agents, comprising guiding the mixture through an exiting channel comprising a first portion from an entrance to a point having a smallest cross-sectional area and a second portion from the point to an exit, wherein the guiding comprises guiding the mixture through the exiting channel to an exit with a cross-sectional area larger than at least one point within the exiting channel;

wherein the extruding further comprises reducing friction within at least a portion of the exiting channel, and wherein the reducing comprises controlling a temperature of the second portion;

wherein the reducing comprises coating the at least a portion of the exiting channel with a friction-reducing substance, and wherein the coating comprises coating the at least a portion of the exiting channel with tungsten carbon carbide; and controlling pre-foaming in the second portion.

27. A method of producing polymer foam, comprising:

heating a polymer resin to a melt temperature therefor;

selecting at least one blowing agent consisting of at least one ambient gas;

combining the heated polymer resin with the at least one blowing agent to create a mixture;

extruding polymer foam the mixture comparable in quality to that obtainable with hydrocarbon blowing agents, comprising guiding the mixture through an exiting channel comprising a first portion from an entrance to a point having a smallest cross-sectional area and a second portion from the point to an exit, wherein the guiding comprises guiding the mixture through the exiting channel to an exit with a cross-sectional area larger than at least one point within the exiting channel;

wherein the extruding further comprises reducing friction within at least a portion of the exiting channel, and wherein the reducing comprises controlling a temperature of the second portion;

wherein the reducing comprises coating the at least a portion of the exiting channel with a friction-reducing substance, and wherein the coating comprises coating the at least a portion of the exiting channel with a composite comprising nickel and one of tetrafluoroethylene fluorocarbon polymer and fluorinated ethylene-propylene; and controlling pre-foaming in the second portion.

28. A method of producing polymer foam, comprising:

heating a polymer resin to a melt temperature therefor;

selecting at least one blowing agent consisting of at least one ambient gas;

combining the heated polymer resin with the at least one blowing agent to create a mixture;

extruding polymer foam the mixture comparable in quality to that obtainable with hydrocarbon blowing agents, comprising guiding the mixture through an exiting channel comprising a first portion from an entrance to a point having a smallest cross-sectional area and a second portion from the point to an exit; and controlling pre-foaming in the second portion, wherein controlling pre-foaming in the second portion comprises locating at least one air gap between the first portion and the second portion.

* * * * *

UNITED STATES PATENT AND TRADEMARK OFFICE
CERTIFICATE OF CORRECTION

PATENT NO.    : 6,827,888 B2
DATED         : December 7, 2004
INVENTOR(S)   : Harfmann It is certified that error appears in the above-identified patent and that said Letters Patent is hereby corrected as shown below:

Column 9,
Line 60, delete the word "location" and insert -- locating --

Column 10,
Line 44, delete the words "quality agents,"

Column 12,
Line 39, insert the word -- from -- after the word "foam"

Signed and Sealed this

Nineteenth Day of April, 2005

JON W. DUDAS
*Director of the United States Patent and Trademark Office*